UNITED STATES PATENT OFFICE 2,470,967

YEAST TREATMENT

Donald Kenneth Alexander, Dolbeau, Quebec, Canada

No Drawing. Application November 21, 1947, Serial No. 787,469

4 Claims. (Cl. 99—14)

This invention relates to the treatment of yeast for subsequent extraction therefrom of proteinaceous and like substances.

Proteinaceous and other biological substances are bound within the protoplasmic phase of cellular organisms such as yeast. The cell enclosure comprises a semi-permeable membraneous wall and, since the aforementioned biological substances in their native state do not diffuse through this cell wall, it is obvious that in order to permit the extraction of proteins and the like it is necessary first to alter the structure of the membrane wall and/or change the physical structure of the substance to make it diffusible. The generally accepted theory is that proteins exist in the native yeast cell as corpuscular molecules. Their biological activity is dependent upon maintenance of this physical or chemical state. Treatment of the organism with drastic chemical substances such as alkaline solution which ordinarily frees them from this in situ state invariably brings about irreversible changes and consequent destruction of certain biological properties, including enzymatic activity. More specifically, the corpuscular native molecule is generally altered to a fibrous type of molecule which has quite different properties from its precursor. Moreover, heretofore non-drastic extraction procedures have only been possible after prolonged treatment of the yeast with organic solvents or prolonged grinding or some other economically unattractive process.

The filtration of yeasts from alkaline suspensions is also a time-consuming operation owing to the slimy character of the material. The drying of the yeast cake is difficult due to the tendency to form sticky lumps and finally very brittle material, which is difficult to grind or disperse. Unless this operation and the former one can be carried out expeditiously there will be some autolysis and yeast breakdown which is serious if active components of the native yeast cell are sought.

It is an object of the present invention to provide a process of treating yeast wherein the biological properties of the proteinaceous and other substances of the native yeast cell are substantially undisturbed and following which the proteinaceous substances in a stable and active biological state may be extracted from the yeast in a rapid and convenient manner.

In accordance with the invention, diatomaceous silica is thoroughly mixed with an aqueous suspension of the yeast to be treated. The diatomaceous silica may be in the form of a commercial grade of acid-washed flux-calcined filter-aid. The mixture is then filtered, leaving a moist compressed cake of intimately mixed yeast and diatomaceous silica. This product is rapidly dried at a temperature below that at which protein is ordinarily denatured, and simultaneously comminuted to a fine powder.

The following is a specific example of yeast treatment in accordance with the invention:

Diatomaceous silica is added to a yeast suspension in the proportion of approximately 1 gram of silica to 2 grams of yeast (dry basis). The mixture is filtered immediately, while maintaining thorough mixing of the suspension during filtering. The resulting press-cake is pulverized and dried in a current of dry air at a temperature of about 35° C. Comminution of the product is continued as drying proceeds until finally it reaches moisture equilibrium with the atmosphere. The soluble yeast components are then extracted using an agent such as a 0.1 molar solution of phosphate buffer at a pH of 7.2.

As is well known, diatomaceous silica is composed principally of a mixture of different sizes of filiform or needle-shaped diatoms, disc-shaped diatoms and fragments of each. A typical commercial grade has particle sizes of 50% finer than 11 microns and only 6% coarser than 40 microns. For comparison the yeast cell is approximately 5 microns in diameter. The estimated surface area of the diatomaceous silica is relatively tremendous—about 10,000 square centimeters per gram. With the yeast cells in close proximity to these very irregular porous particles of silica during the process it appears that the cell wall of the yeast is weakened or otherwise altered so that the cell contents are no longer closely bound.

In any event, the resultant product is one from which the proteinaceous and like substances in stable and biologically active state may be readily extracted without the use of drastic means such as high acid concentrations, high alkali concentrations or high temperatures. Thus, such valuable constituents of the yeast may be readily dispersed in solution by moderate chemical means without destroying the natural and physiological properties of such constituents.

Moreover, it has been found that the addition of diatomaceous silica materially speeds up and facilitates the operations in which the wet yeast is washed, filtered, dried, comminuted and extracted, so that there is a minimum elapsed time in which fermentative breakdown of the yeast may occur. After drying and comminution, the product is very stable and extraction may be performed on the dried material at any time. A considerably greater yield, as compared with usual methods, of proteinaceous and like substances from the yeast is also obtained.

What is claimed is:

1. A method of treating yeast for subsequent extraction therefrom of stable, biologically active proteinaceous and like substances which comprises thoroughly admixing diatomaceous silica with an aqueous suspension of yeast, filtering the mixture, and drying and comminuting to a fine powder the resultant filter cake.

2. A method of producing proteinaceous and like substances which comprises thoroughly admixing diatomaceous silica with an aqueous suspension of yeast, filtering the mixture, drying and comminuting to a fine powder the filter cake, and extracting from the powder the biologically active components of the native yeast cell.

3. A method of producing proteinaceous and like substances which comprises adding dry diatomaceous silica to an aqueous suspension of native yeast, thoroughly admixing the silica and yeast, filtering the mixture while maintaining thorough mixing thereof, and simultaneously drying and comminuting the filter cake in a current of dry air until it reaches moisture equilibrium with the atmosphere.

4. A method of producing proteinaceous and like substances which comprises adding dry diatomaceous silica to an aqueous suspension of native yeast in the proportion of approximately one gram of silica to two grams of yeast (dry basis), thoroughly admixing the silica and yeast, filtering the mixture while maintaining thorough mixing thereof, and simultaneously drying and comminuting the filter cake in a current of dry air at a temperature of approximately 35° C. until it reaches moisture equilibrium with the atmosphere.

DONALD KENNETH ALEXANDER.

REFERENCES CITED

The following references are of record in the file of this patent:

UNITED STATES PATENTS

| Number | Name | Date |
|---|---|---|
| 1,488,815 | Harris | Apr. 1, 1924 |
| 1,642,320 | Balls | Sept. 13, 1927 |
| 1,991,629 | Riley | Feb. 19, 1935 |

OTHER REFERENCES

Enzymes by Waksman et al., 1926 ed., page 5.